United States Patent
Thokala et al.

(10) Patent No.: US 12,468,871 B2
(45) Date of Patent: Nov. 11, 2025

(54) METHOD AND SYSTEM FOR FORECASTING BUILDING POWER CONSUMPTION

(71) Applicant: Tata Consultancy Services Limited, Mumbai (IN)

(72) Inventors: Naveen Kumar Thokala, Hyderabad (IN); Vishnu Brindavanam, Hyderabad (IN); Spoorthy Paresh, Bangalore (IN); Mariswamy Girish Chandra, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 925 days.

(21) Appl. No.: 17/653,266

(22) Filed: Mar. 2, 2022

(65) Prior Publication Data
US 2022/0327263 A1   Oct. 13, 2022

(30) Foreign Application Priority Data
Mar. 3, 2021   (IN) .............................. 202121008966

(51) Int. Cl.
*G06F 7/48*     (2006.01)
*G06F 30/27*    (2020.01)
*G06F 111/18*   (2020.01)

(52) U.S. Cl.
CPC .......... *G06F 30/27* (2020.01); *G06F 2111/18* (2020.01)

(58) Field of Classification Search
CPC .. G01D 2204/12; G01D 4/00; G06F 2111/18; G06F 30/27; G06N 20/10; G06N 3/08; G06Q 10/04; G06Q 50/06; G06Q 50/163
See application file for complete search history.

(56) References Cited

U.S. PATENT DOCUMENTS

| 8,706,650 B2 * | 4/2014 | Ozog | H02J 3/008 |
| | | | 705/400 |
| 2003/0061091 A1 * | 3/2003 | Amaratunga | G06Q 10/06375 |
| | | | 705/7.31 |

(Continued)

OTHER PUBLICATIONS

Ogcu, Gamze et al., "Forecasting electricity consumption with neural networks and support vector regression", Procedia—Social and Behavioral Sciences, Date: Oct. 2012, vol. 58, pp. 1576-1585, Publisher: Elsevier, https://reader.elsevier.com/reader/sd/pll/S187704281204606X?token=B1F2026085062EF4990592CBC68FA02C00CC315ED93A58CC8883D94C0FA456A23122002AC92F084E0070EF84496E6505&orginRegion=eu-west-1&originCreation=20220111041204.

(Continued)

*Primary Examiner* — Nithya J. Moll
(74) *Attorney, Agent, or Firm* — FINNEGAN, HENDERSON, FARABOW, GARRETT & DUNNER LLP

(57) ABSTRACT

Power consumption forecasting plays a key role in the efficient operation of a building energy management system to assess energy demands of building, and at the same time, help electrical utilities in planning their supply operations. However, no state-of-the-arts are available for forecasting medium-term or long-term power consumption of the buildings. This disclosure relates to a method and system for forecasting a power consumption of buildings for a scalable forecast horizon. The system is configured to pre-process to deal with outliers/missing values, followed by synchronization of smart meter data with other sensory data. An energy-temperature correlation is calculated to estimate an energy drift using historical power consumptions. Further, in feature derivation stage, additional features necessary for the forecast are derived. The system is to be employed for (Continued)

modeling the building load consumption that depends on the time horizon of forecasting and the granularity of the data.

10 Claims, 6 Drawing Sheets

(56) References Cited

U.S. PATENT DOCUMENTS

| | | | |
|---|---|---|---|
| 2004/0102937 A1* | 5/2004 | Ibrahim | G05B 13/048 703/2 |
| 2012/0232701 A1* | 9/2012 | Carty | G05D 23/1917 700/277 |
| 2014/0336960 A1* | 11/2014 | Haghighat-Kashani | G01R 21/133 702/60 |
| 2015/0317589 A1 | 11/2015 | Anderson et al. | |
| 2016/0305678 A1* | 10/2016 | Pavlovski | G05B 15/02 |

OTHER PUBLICATIONS

Kandil, M.S. et al., "Long-term load forecasting for fast developing utility using a knowledge-based expert system", IEEE Transactions on Power Systems, Date: May 2002, vol. 17, Issue: 2, pp. 491-496, Publisher: IEEE. https:ieeexplore.ieee.org/stamp.jsp?tp=&arnumber=4312144.

Fan, Shu et al., "Short-Term Load Forecasting Based on an Adaptive Hybrid Method", IEEE Transactions on Power Systems, Date: Feb. 2006, vol. 21, Issue: 1, pp. 392-401, Publisher: IEEE, http://citeseerx.ist.psu.edu/viewdoc/download;jsessionid=18C539EB78B7F7A111C9A5111EBD99D2?doi=10.1.1.468.91&rep1&type=pdf.

* cited by examiner

METHOD AND SYSTEM FOR FORECASTING BUILDING POWER CONSUMPTION

CROSS-REFERENCE TO RELATED APPLICATIONS AND PRIORITY

This U.S. patent application claims priority under 35 U.S.C. § 119 to Indian provisional patent application number 202121008966, filed on Mar. 3, 2021. The entire contents of the aforementioned application are incorporated herein by reference.

TECHNICAL FIELD

The disclosure herein generally relates to the field of forecasting power consumption, and more specifically, to a method and system for forecasting a power consumption of one or more buildings for a scalable forecast horizon.

BACKGROUND

Electrical load forecasting plays a key role in the efficient operation of a building energy management system. Power consumption forecasting solutions help commercial building mangers assess their energy demands, and at the same time, help electrical utilities in planning their supply operations. These aspects help to avoid revenue losses due to power supply disruptions and aligns supply with the demand and vice-versa. Needless to say, this is vital for present-day demand-supply conditions. To help in such energy management, a range of load forecasting solutions have been developed of late for short term, medium term, and long term, depending on the forecast horizon. These forecast horizons may cater for the requirements of hours-ahead, day-ahead, quarter-ahead, and month-ahead forecasting of power consumption.

Usually, Short-term load forecasts, such as hours-ahead and day-ahead forecasts, help the building manager to streamline the power consumption by adopting peak-load shaving, time-of-use pricing/demand response and energy bidding approaches. The medium-term or long-term building energy forecasts, i.e., month, and quarter-ahead forecasts, respectively, are useful in assessing fuel resources required for the continuous operation of the building, budgeting etc. Medium-term and long-term forecasts also can be used at distribution level so that electrical utilities can plan their operations of the electrical power system efficiently.

SUMMARY

Embodiments of the disclosure present technological improvements as solutions to one or more of the above-mentioned technical problems recognized by the inventors in conventional systems. For example, in one embodiment, a method and system for forecasting a power consumption of one or more buildings for a predefined forecast horizon is provided.

In one aspect, a processor-implemented method for forecasting a power consumption of one or more buildings for a predefined forecast horizon is provided. The method includes one or more steps such as receiving a historical power consumption data and corresponding a range of temperature value, occupancy data information of location and holidays of the one or more buildings from one or more historical databases, and pre-processing the received plurality of historical power consumption data to remove one or more redundant data, one or more outliers, one or more unreal values from the received historical power consumption data and impute missing values of the received historical power consumption data. Further, the method includes calculating an energy-temperature correlation using the historical power consumption data and the historical range of temperature value and estimating an energy drift using the historical power consumption data, wherein energy drift is change in average power consumption of a predefined month in consecutive years.

Furthermore, the method includes selecting at least one model based on the estimated energy drift and calculated energy-temperature correlation, deriving one or more auto-regressive (AR) features from the historical power consumption data using a partial auto-correlation function, and generating a predictor matrix using the one or more derived AR features, and historical information of occupancy, temperature, weekday and holidays of the one or more buildings. Furthermore, the method include training the at least one selected model using the generated predictor matrix and forecasting the power consumption of the one or more buildings for the predefined forecast horizon using the trained at least one model and information of occupancy, temperature, weekdays, holidays, and the location of the one or more buildings.

In another aspect, a system for forecasting a power consumption of one or more buildings for a predefined forecast horizon is provided. The system includes an input/output interface configured to receive a historical power consumption data and corresponding a range of temperature value, occupancy data information of location and holidays of the one or more buildings from one or more historical databases, one or more hardware processors and at least one memory storing a plurality of instructions, wherein the one or more hardware processors are configured to execute the plurality of instructions stored in the at least one memory.

Further, the system is configured to pre-process the received plurality of historical power consumption data to remove one or more redundant data, one or more outliers, one or more unreal values from the received historical power consumption data and impute missing values of the received historical power consumption data, calculate an energy-temperature correlation using the historical power consumption data and the historical range of temperature value and estimate an energy drift using the historical power consumption data. Herein the energy drift is a change in average power consumption of a predefined month in consecutive years.

Furthermore, the system is configured to select at least one model based on the estimated energy drift and calculated energy-temperature correlation, derive one or more auto-regressive (AR) features from the historical power consumption data using a partial auto-correlation function, and generate a predictor matrix using the one or more derived AR features, and historical information of occupancy, temperature, weekday and holidays of the one or more buildings. Furthermore, the system is configured to train the at least one selected model using the generated predictor matrix and forecast the power consumption of the one or more buildings for the predefined forecast horizon using the trained at least one model and information of occupancy, temperature, weekdays, holidays, and the location of the one or more buildings.

In yet another aspect, there are provided one or more non-transitory machine-readable information storage mediums comprising one or more instructions, which when executed by one or more hardware processors causes a method for forecasting a power consumption of one or more buildings for a predefined forecast horizon is provided. The method includes one or more steps such as receiving a historical power consumption data and corresponding a range of temperature value, occupancy data information of location and holidays of the one or more buildings from one or more historical databases, and pre-processing the received plurality of historical power consumption data to remove one or more redundant data, one or more outliers, one or more unreal values from the received historical power consumption data and impute missing values of the received historical power consumption data. Further, the method includes calculating an energy-temperature correlation using the historical power consumption data and the historical range of temperature value and estimating an energy drift using the historical power consumption data, wherein energy drift is change in average power consumption of a predefined month in consecutive years.

Furthermore, the method includes selecting at least one model based on the estimated energy drift and calculated energy-temperature correlation, deriving one or more auto-regressive (AR) features from the historical power consumption data using a partial auto-correlation function, and generating a predictor matrix using the one or more derived AR features, and historical information of occupancy, temperature, weekday and holidays of the one or more buildings. Furthermore, the method include training the at least one selected model using the generated predictor matrix and forecasting the power consumption of the one or more buildings for the predefined forecast horizon using the trained at least one model and information of occupancy, temperature, weekdays, holidays, and the location of the one or more buildings.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
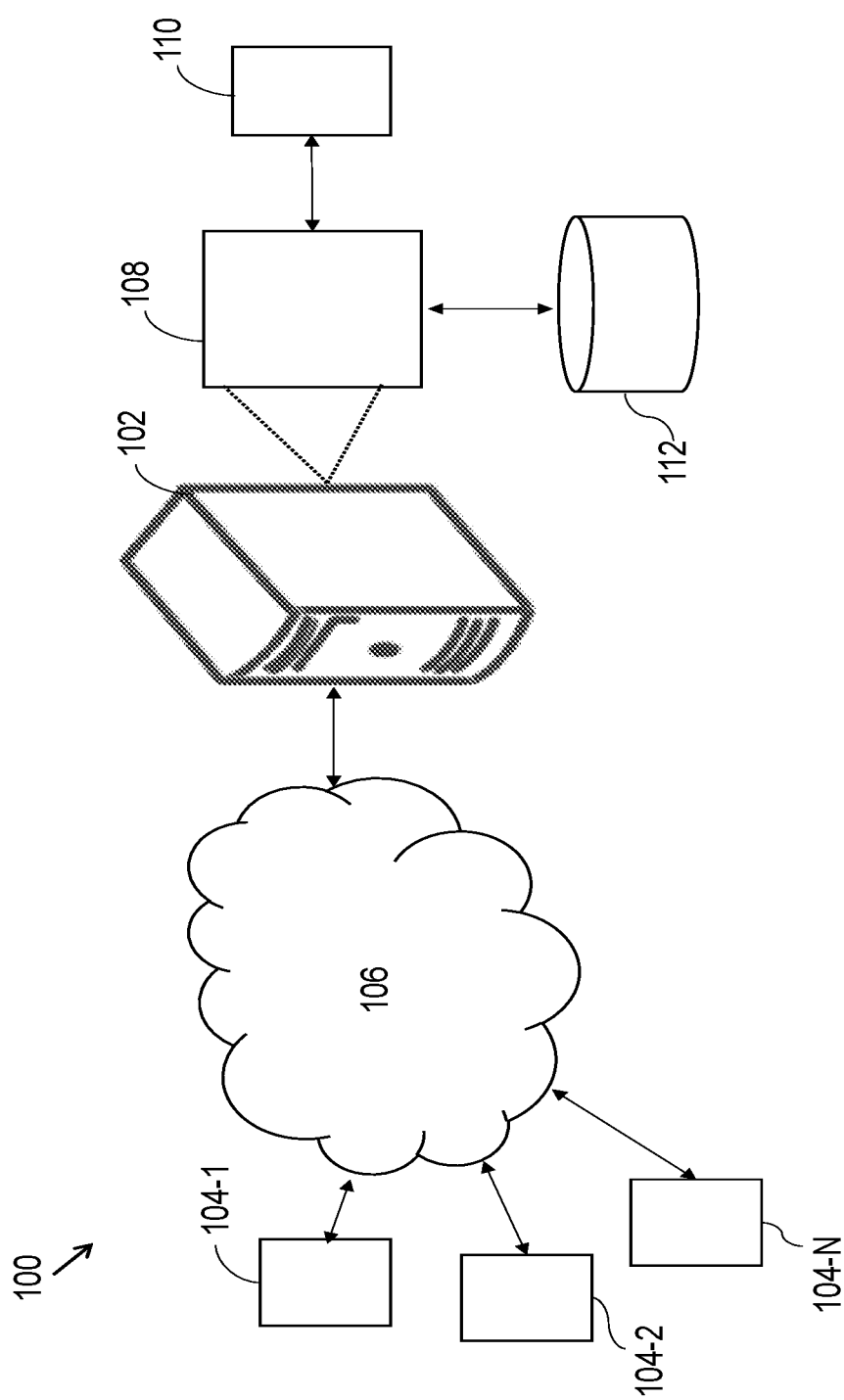
FIG. 1 illustrates an exemplary system for forecasting a power consumption of one or more buildings for a pre-defined forecast horizon, according to an embodiment of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and system for forecasting a power consumption of one or more buildings for a predefined forecast horizon. It would be appreciated that power load forecasting plays a key role in the efficient operation of the one or more buildings energy management systems. Herein, a framework is proposed for effective scalable implementation of one or more buildings load forecasting of a scalar forecast horizon. The framework comprises of techniques to deal with outliers and missing values, dynamic input feature selection as well as a hybrid model combining direct and recursive strategies for forecasting. Further, the system is configured to pre-process to deal with outliers/missing values, followed by synchronization of smart meter data with other sensory data. In feature derivation stage additional features necessary for the forecast are derived. The system is to be employed for modeling the one or more buildings power consumption depends on the time horizon of forecasting and the granularity of the data.

Referring now to the drawings, and more particularly to FIG. 1 through 6, where similar reference characters denote corresponding features consistently throughout the figures, there are shown preferred embodiments and these embodiments are described in the context of the following exemplary system and/or method.

FIG. 1 illustrates a block diagram of a system (100) for forecasting a power consumption of one or more buildings for a predefined forecast horizon, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

Figure 2:
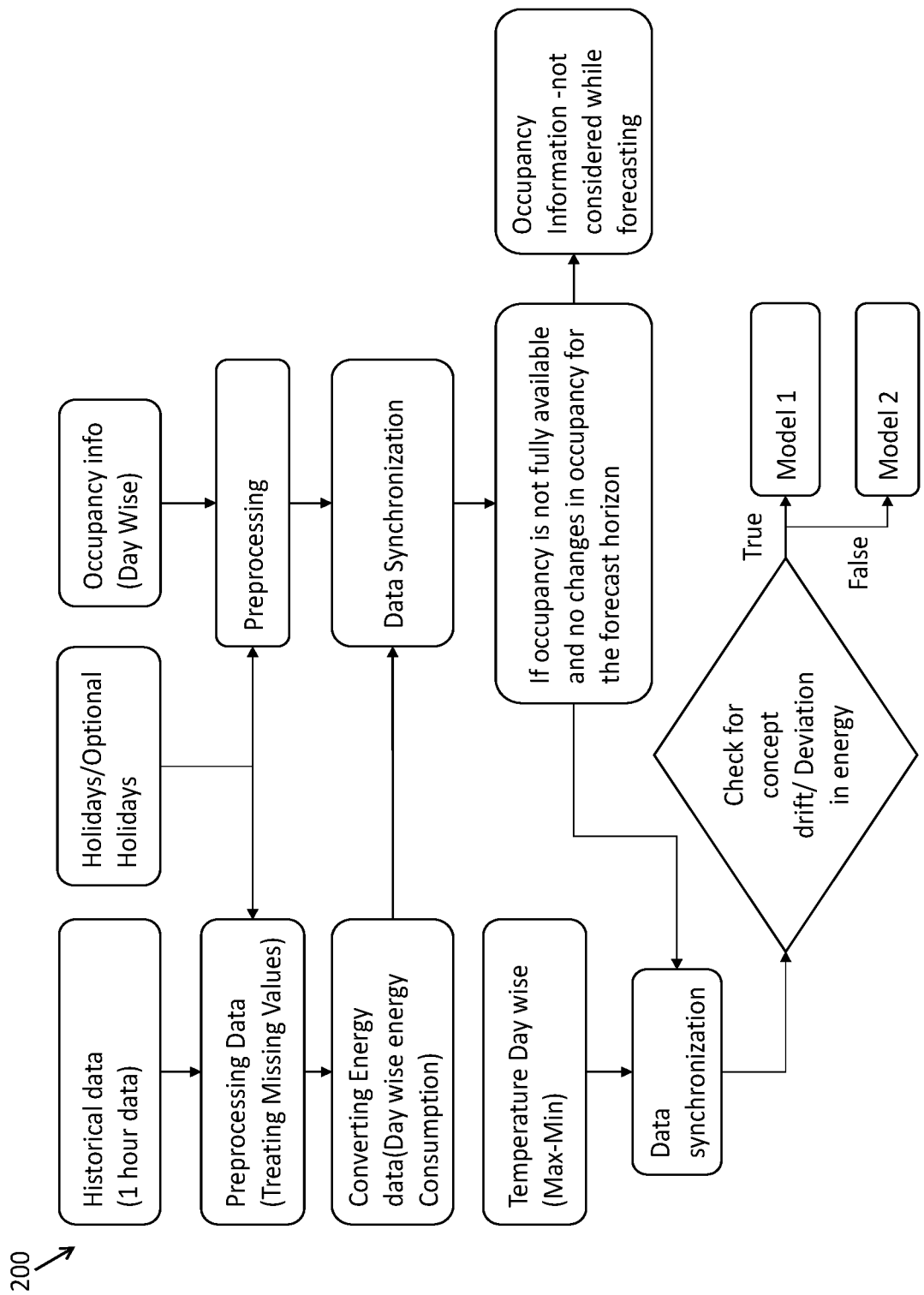
FIG. 2 is a functional block diagram to illustrate forecasting a power consumption of one or more buildings, according to an embodiment of the present disclosure.

Referring FIG. 2, illustrates a functional block diagram (200) of the system (100) for forecasting a power consumption of one or more buildings for a predefined forecast horizon. It would be appreciated that one of the major challenges in long-term one or more buildings load forecasting is the time horizon for which one or more independent (explanatory) variables also need to be forecasted. Therefore, the system is configured for long-term forecasting rather than resolve function to be used to model the time-series.

Further, the system (100) comprises at least one memory with a plurality of instructions, one or more databases (112), one or more input/output (I/O) interfaces (104) and one or more hardware processors (108) which are communicatively coupled with the at least one memory to execute a plurality of modules (114) therein. The one or more I/O interfaces (104) are configured to receive a historical power consumption data and corresponding a range of temperature value, occupancy data information of location and holidays of the one or more buildings from one or more historical databases. The one or more I/O interfaces (104) are configured to convey the forecasted power consumption of the one or more buildings for the predefined forecast horizon from the system (100) back to the user.

It is to be noted that the input to the system (100) comprising historical power consumption data and corresponding a range of temperature value, occupancy data information of location and holidays of the one or more buildings from a historical information database. The I/O interfaces (104) are configured to receive data from the historical experiment database and send the received data to the system (100). The historical experiment database maintains the physical sensors data of power consumption along with the sensory information useful in one or more buildings' power consumption like occupancy and weather information. The occupancy and weather information needs to be pre-processed to remove discrepancies that enter into the databases during the data acquisition.

Figure 3:
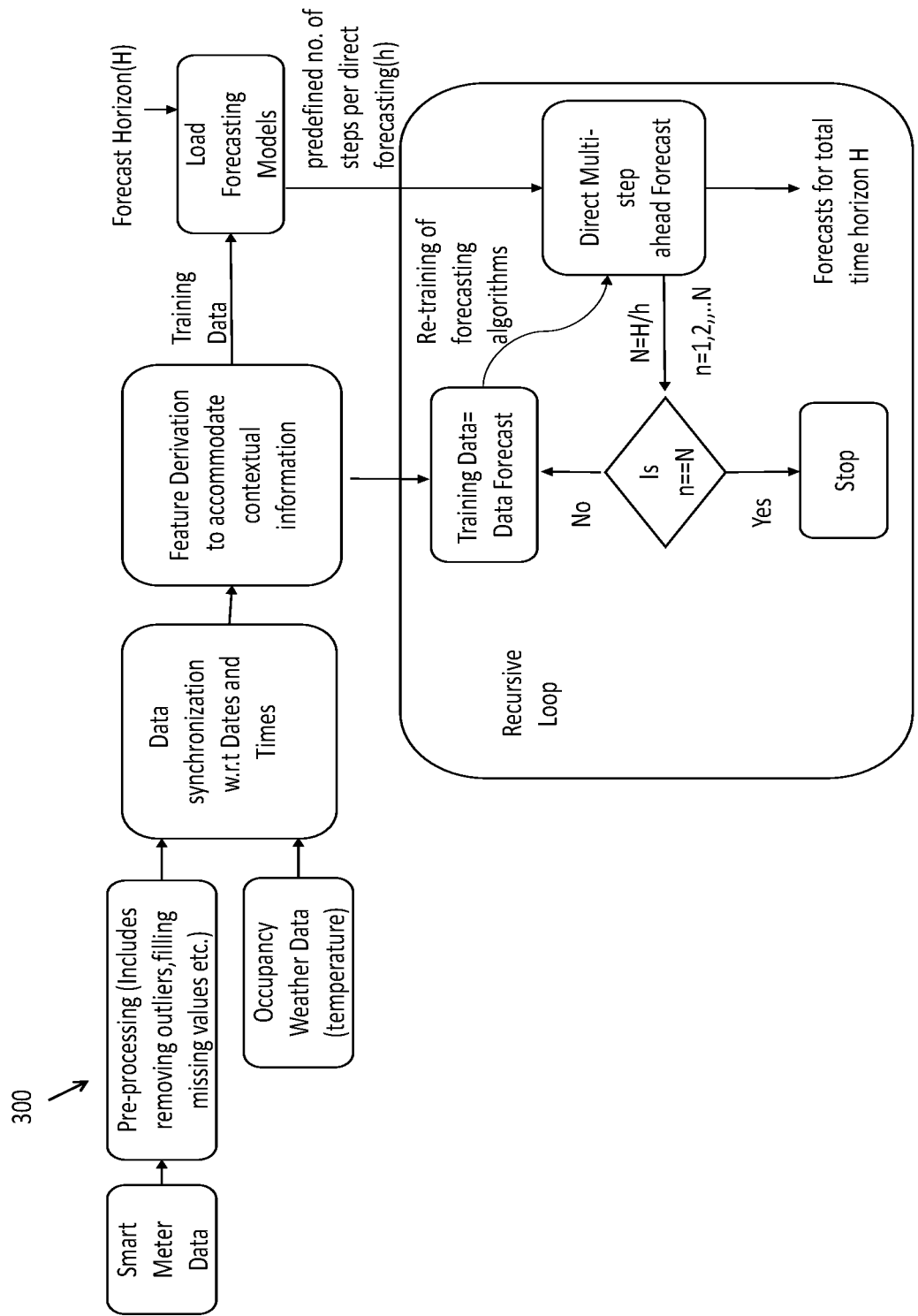
FIG. 3 is a functional block diagram to illustrate preprocessing and energy-temperature correlation, according to an embodiment of the present disclosure.

Referring FIG. 3, a functional block diagram (300), wherein the system (100) is configured to pre-process the received historical power consumption data to remove one or more redundant data, one or more outliers, one or more unreal values from the received historical power consumption data and impute missing values of the received historical power consumption data. The pre-processing involves removal of one or more redundant data, unification of sampling frequency, filtering of data, outlier identification & removal, imputation of missing data, synchronization of data by incorporating appropriate lags, and integration of variables from various data sources. The historical data is re-arranged to bring out proximity between different time instants of energy consumption. For this, a suitable window on the historical data is fixed to re-arrange the data. This window corresponds to similar factors such as time-of-the-day, day-of-the-week, season, one or more buildings location etc. across the entire range of available historical data. Such an arrangement of one or more buildings energy consumption data can bring out the quasi-stationary in the data, thereby making it suitable to assess and if needed, correct the large deviations present in the historical data.

It is to be noted that a weighted mean is used to impute the values by filtering the data using time of the day, weekday, and holidays information to get the similar values for the similar situations. Herein, the weighted means giving importance to most recent values of a particular day. Further, the data synchronization is carried out to have an appropriate mapping of the power consumption data with other sensory information such as occupancy and temperature. Usually, the occupancy and temperature are available at one-hour granularity. To synchronize, temperature is interpolated every 15 minutes using the hourly values and occupancy is maintained constant and replicated every 15 minutes during the one-hour time-period.

Further, the system (100) is configured to calculate an energy-temperature correlation using the historical power consumption data and the historical range of temperature value. The temperature information for the forecast horizon is obtained from the web, weekday information is obtained from the Gregorian calendar, holidays information is obtained from the location of one or more buildings.

It would be appreciated that time-series forecasting is defined as an extrapolation of the time series for the future dates or times and it requires modeling the time-series in terms of its components like trend, seasonality, cyclic patterns, and exogenous variables, if any. Forecasting involves developing the models using the historical data and forecasting the future values of the time-series as explained in FIG. 3. Let Y be a stationary time series and Y (t+1) the value of the time series Y at (t+1). Then Y (t+1) can be as follows:

$$Y(t+1)t = f(X,Y) \quad (1)$$

wherein, f is a function and its properties are decided by a learning model considered for modeling the time series. In the linear case, Y (t+1) would be the linear function of lag values of Y and other independent variables $x_i$, then the function f takes the following form:

$$Y(t+1)t = \Sigma_{i=1}^{n} \phi_i * Z_i + \in_t \quad (2)$$

wherein, $\phi$ represents the parameters of the function learning and Z represent the vector consisting of both lagged values of Y and independent variable X that impact that impact Y. In general, the historical power consumption data is not used for modeling, only appropriate lags that are useful to be used. In multi-step forecasting, it requires to forecast values at multiple steps for example forecasting $Y_{(t+1)-(t+h)}$ at t. Herein, a Hybridized Direct-Recursive (HDR) is used to have a total forecast horizon H divided into n slots each of length h. The direct multi-step forecast strategy is used to forecast the first h values and then these forecasted values of the initiate slot (h steps) are used as an input for forecasting the second slot. This continues until the last slot.

$$Y(t+1, \ldots, t+h)t = f(Y,X) \qquad (3)$$

$$Y(t+h+1, \ldots, t+2h)t = f(Y(t+h), \ldots, Y(t+1),Y,X) \qquad (4)$$

$$Y(t+(n-1)h+1, \ldots, +nh)t = fY(t+(n-1)h), \ldots, Y(t+1),Y,X \qquad (5)$$

It would be appreciated that the HDR forecast strategy is used to forecast month and quarter ahead one or more buildings' total power consumption. Smart meter measures total power consumption of the one or more buildings in every 15 minutes.

In the preferred embodiment, the system (100) is configured to estimate an energy drift using the historical power consumption data, wherein energy drift is change in average power consumption of a predefined month in consecutive years. It would be appreciate that for the historical power consumption data provided, the energy drift is computed as change in average power consumption, for a particular month of interest over consecutive years.

In one example, for a month of September, an energy drift is the change in power consumption over consecutive years. Herein, the consumption data of m month of y year is compared with m month of (y−1) year. It is calculated considering the pattern of the m month of (y−1) year and return the energy drift value. Calculating the percentage deviation gives the difference between the pattern of consumption data. Partial correlation function is used to obtain lags of the energy data. The useful lags are then obtained as those that correspond more to the season under consideration, rather than the immediate months. The system is configured to obtain useful lags from the partial correlation function chooses some lag from the month and year of consideration and sifts through the data to discard the irrelevant lags after threshold and to collect lags from similar seasons of historical data in adequate numbers, so as to form an entropy measure of the energy data for useful information.

Again referring FIG. 2, wherein the system (100) is configured to select at least one model based on the estimated energy drift and the calculated energy-temperature correlation. Wherein, the at least one model, as explained in FIGS. 4 & 5, includes a seasonal support vector regression (SSVR) model, a support vector regression (SVR) model, an Artificial Neural Network (ANN) model. It is to be noted that when there is no energy drift, the historical power consumption data is used, and seasonality data is removed to generate the one or more AR features and a predictor matrix. Further, the recursive forecasts are generated using SVR model and then seasonality is added to forecasts.

Furthermore, the SVR model is selected where linear correlation between energy and temperature is greater than or equal to predefined threshold value. The ANN model is selected where linear correlation between energy and temperature is less than predefined threshold value. Herein, the SVR model and the ANN model is considered as the non-linear relationship that exist between the input (predictor matrix) and the output (power consumption).

Figure 4:
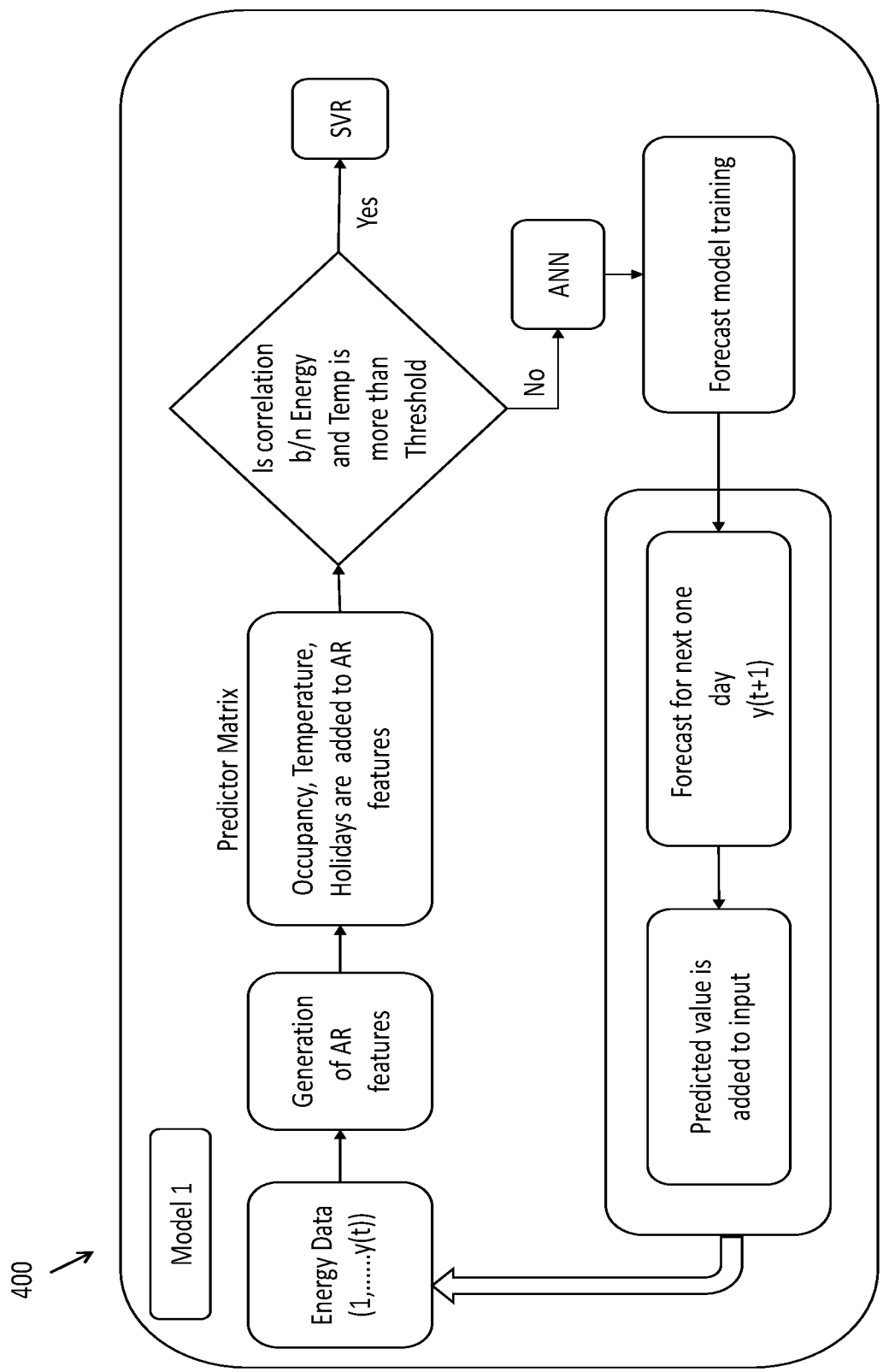
FIG. 4 is a functional block diagram to illustrate selection of at least one model, according to an embodiment of the present disclosure.
Figure 5:
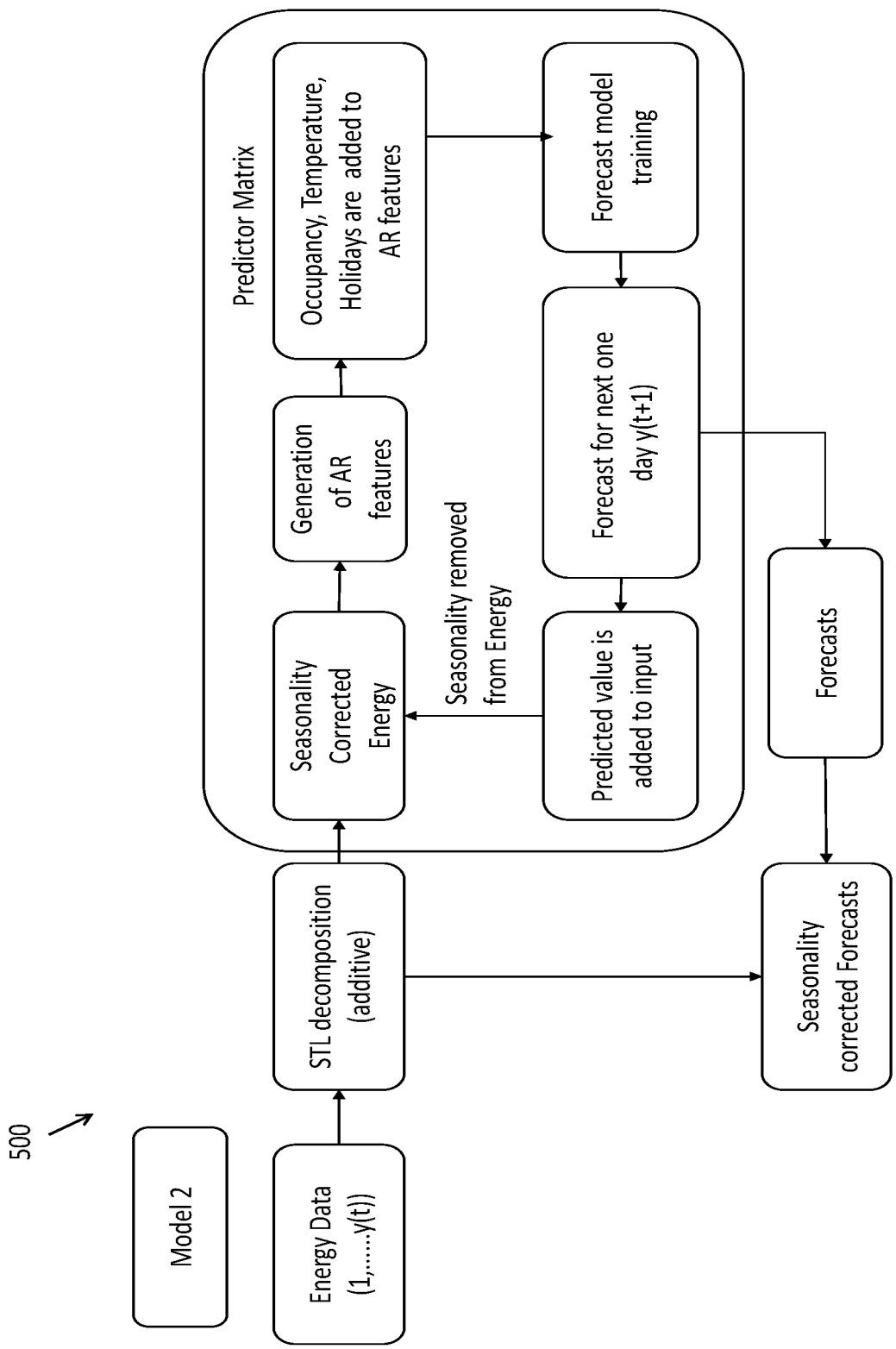
FIG. 5 is a functional block diagram to illustrate the training of the forecast model, according to an embodiment of the present disclosure.

In the FIG. 4, after synchronization of the energy data, an auto-regressive model is generated, and a predictor matrix is produced. Further, the correlation between energy data and the temperature data is calculated and if the correlation value is more than the predefined threshold value, then the SVR model is selected to forecast the value for next day. Herein, a recursive forecasting takes place in the forecast model training i.e. the predicted value is added back to input and again forecast the next day value. Furthermore, if the correlation value is equal or less than the predefined threshold value, then the ANN model is selected to forecast the value for next day as shown in FIG. 5.

In the preferred embodiment, the system (100) is configured to derive one or more auto-regressive (AR) features from the historical power consumption data using a partial auto-correlation function. Herein, the one or more AR features are in which the current values are based on the immediately preceding values. For example, an AR (1) wherein the AR process is one in which the current value is based on the immediately preceding value while for an AR (2) the AR process is based on the previous two values.

It would be appreciated that a lag with highest correlation is used to derive the one or more AR features. Herein, new features derivation and selection are carried out for time-series modelling of power consumption. Dummy variables are created to capture the contextual information like day of the week, time of the day, holidays etc. The lags of power consumption are selected using the partial auto-correlation function. The power consumption lags together with dummy variables are used to capture contextual information forms the predictor matrix.

It is to be noted that the power consumption of the one or more buildings is influenced by many factors like temperature (HVAC loads), occupancy, and other factors like the working day or holiday etc. making it difficult for the linear algorithms like linear regression (LR), and Auto-regressive Integrated Moving Average (ARIMA) etc. to forecast accurately. Further, similar to day-wise energy consumption, day-wise maximum and minimum temperatures as well as occupancy are considered as time-series. For the predefined forecast horizon, maximum and minimum temperature forecasts are taken from the predefined weather websites and the occupancy is extrapolated using ARIMA. Herein, the contextual information such as working day, month of the year are captured in the form of dummy variables.

In one example, wherein total forecast horizon for the month ahead forecasting at 15 minutes granularity is H=2880 (30 days with 96 samples every day). The total forecasting horizon is divided into 5 slots, i.e. each slot will have 576-time steps. The direct forecast is used to forecast 576-time steps (6 days) and these forecasted values are added to input to forecast for the next 6 days of one or more buildings power consumption. This is repeated five time to get a month ahead forecasting. The ANN is used as the function f for performance comparison. Herein, the performance of the system is demonstrated using the actual power consumption of the one or more buildings. For performance evaluation Symmetric Mean Absolute Percentage Error (SMAPE) and a Normalized Root Mean Squared Error (NRMSE) are considered as the error terms as these are scale independent making them applicable for comparing model performance across one or more buildings of different capacities.

In the preferred embodiment, wherein the system (100) is configured to generate a predictor matrix using the one or more derived AR features, and historical information of occupancy, temperature, weekday, and holidays of the one or more buildings. The predictor matrix is used as an input and a power consumption is provided as the output for training the selected at least one model.

In the preferred embodiment, the system (100) is configured to train the at least one selected model using the generated predictor matrix. As explained in FIG. 2, once the energy drift is computed for a month under consideration and the requisite predictor matrix is formed, depending on the energy-temperature correlation, the at least one model is selected as explained above.

In the preferred embodiment, the system (100) is configured to forecast the power consumption of the one or more buildings for the predefined forecast horizon using the trained at least one model and information of occupancy, temperature, weekdays, holidays, and the location of the one or more buildings. Herein, the forecasted power consumption value of the predefine day is added to the input data while forecasting the energy consumption for the next day. The HDR is for the long-horizon one or more buildings' power consumption. The HDR framework is efficient due to its effective logic for handling outliers and missing values and additional contextual features derived to capture the dynamics of the one or more buildings power consumption. Furthermore, the HDR is capable in estimating the functional parameters for every new slot in predefined forecast horizon making it more efficient in forecasting accurately even as the horizon increases.

In yet another embodiment, wherein the system (100) is configured to forecast the occupancy of the one or more buildings using a moving average model for weekdays and weekends.

Figure 6:
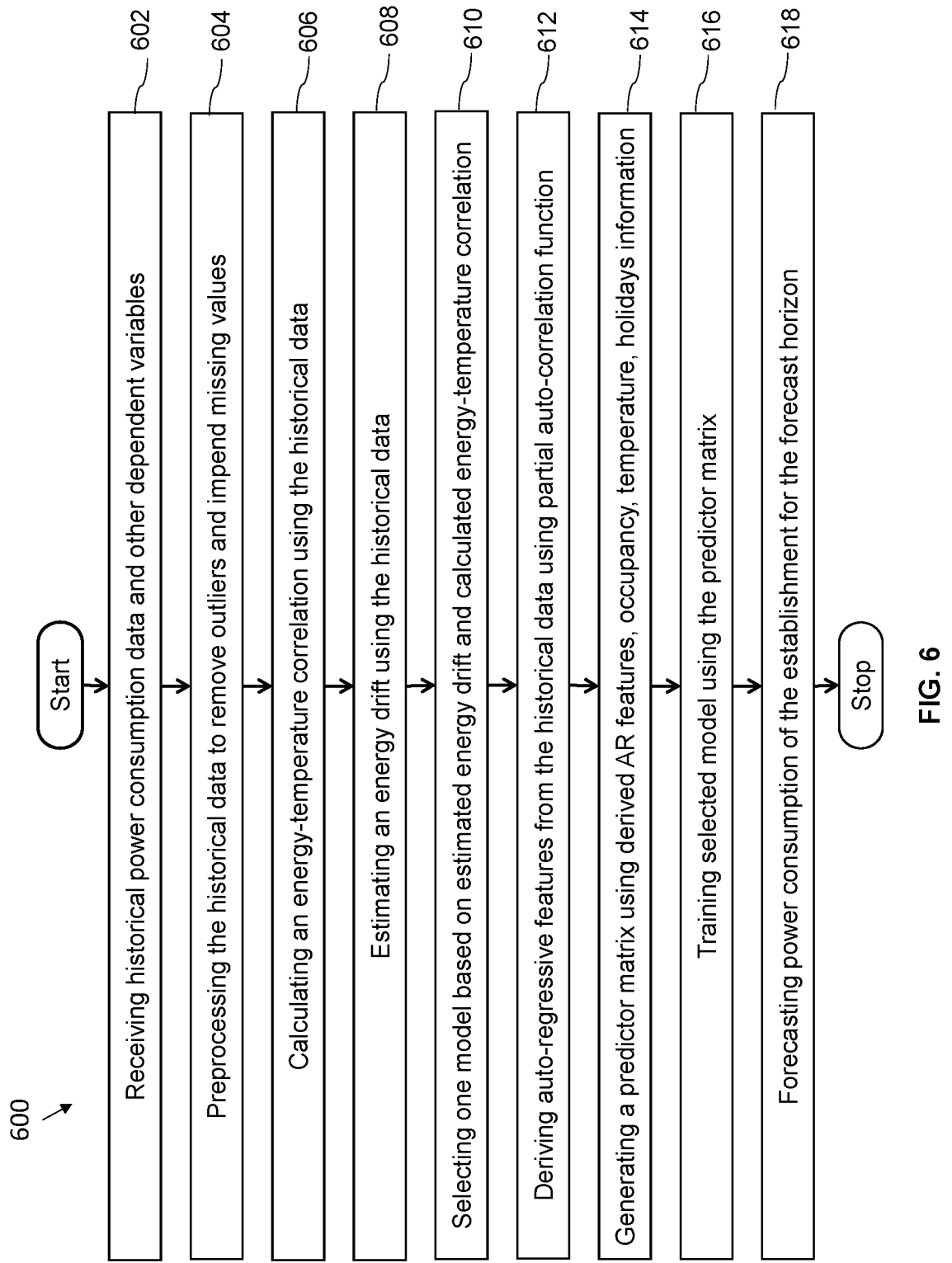
FIG. 6 is a flow diagram to illustrate a method for forecasting a power consumption of one or more buildings for a predefined forecast horizon, in accordance with some embodiments of the present disclosure.

Referring FIG. 6, to illustrate a processor-implemented method (600) for forecasting a power consumption of one or more buildings for a predefined forecast horizon is provided.

Initially, at the step (602), receiving, via an input/output interface, a historical power consumption data and corresponding a range of temperature value, information of occupancy data, location, and holidays of the one or more buildings from one or more historical databases.

At the next step (604), preprocessing the received historical power consumption data to remove one or more redundant data, one or more outliers, one or more unreal values from the received historical power consumption data and impute missing values of the received historical power consumption data.

At the next step (606), calculating, via the one or more hardware processors, an energy-temperature correlation using the historical power consumption data and the historical range of temperature value.

At the next step (608), estimating, via the one or more hardware processors, an energy drift using the historical power consumption data, wherein energy drift is change in average power consumption of a predefined month in consecutive years.

At the next step (610), selecting, via the one or more hardware processors, at least one model based on the estimated energy drift and calculated energy-temperature correlation, wherein the at least one model includes a seasonal support vector regression (SSVR) model, a support vector regression (SVR) model, and an artificial neural network (ANN) model.

At the next step (612), deriving, via one or more hardware processors, one or more auto-regressive (AR) features from the historical power consumption data using a partial auto-correlation function.

At the next step (614), generating, via one or more hardware processors, a predictor matrix using the one or more derived AR features, and historical information of occupancy, temperature, weekday, and holidays of the one or more buildings. The predictor matrix is used as the input and a power consumption is provided as the output for training the selected at least one model.

At the next step (616), training, via the one or more hardware processors, the at least one selected model using the generated predictor matrix.

At the last step (618), forecasting, via the one or more hardware processors, the power consumption of the one or more buildings for the predefined forecast horizon using the trained at least one model and information of occupancy, temperature, weekdays, holidays, and the location of the one or more buildings.

In yet another embodiment, the method comprising forecasting the occupancy of the one or more buildings using a moving average model for weekdays and weekends.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of reliably forecasting a power consumption of one or more buildings for a predefined forecast horizon. Therefore, embodiments herein provide a system and method for forecasting a power consumption of a one or more buildings for a predefined forecast horizon. The framework is proposed for effective scalable implementation of a predefined forecast horizon one or more buildings load forecasting. The framework comprises of techniques to deal with outliers and missing values, dynamic input feature selection as well as a hybrid algorithm combining direct and recursive strategies for forecasting.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional one or more buildings blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

What is claimed is:

1. A processor-implemented method for forecasting a power consumption of one or more buildings for a predefined forecast horizon comprising:
   receiving, via an input/output interface, a historical power consumption data and corresponding range of temperature values, an occupancy data, and a location of the one or more buildings from one or more historical databases, wherein the one or more historical databases maintains physical sensors data of power consumption along with the sensory information useful in the one or more power consumption including occupancy and weather information, wherein the occupancy and weather information is pre-processed to remove discrepancies prior to entering into the historical databases;
   pre-processing, via one or more hardware processors, the received historical power consumption data to:
   remove one or more redundant data, one or more outliers, one or more unreal values from the received historical power consumption data; and
   impute missing values of the received historical power consumption data;
   synchronization of smart meter data with sensory information received from data sources including occupancy and weather information;
   re-arrange the received historical power consumption data to bring proximity between varied time instants of energy consumption by fixing a window on the historical power consumption data, wherein the received historical power consumption data corresponds to a time-of-the-day, a day-of-the-week, a season, and the location of the one or more buildings;
   calculating, via the one or more hardware processors, an energy-temperature correlation using the pre-processed historical power consumption data and a received historical range of temperature value;
   estimating, via the one or more hardware processors, an energy drift using the pre-processed historical power consumption data, wherein energy drift is a change in an average power consumption of a predefined month in consecutive years;
   selecting, via the one or more hardware processors, at least one model based on the estimated energy drift and the calculated energy-temperature correlation, wherein the at least one model includes one or more of a seasonal support vector regression (SSVR) model, a support vector regression (SVR) model, or an artificial neural network (ANN) model;
   deriving, via the one or more hardware processors, one or more auto-regressive (AR) features from the pre-processed historical power consumption data using a partial auto-correlation function;
   generating, via the one or more hardware processors, a predictor matrix using the one or more derived AR features, and the received historical information of occupancy, temperature, and holidays of the one or more buildings;
   training, via the one or more hardware processors, the at least one selected model using the generated predictor matrix;
   forecasting, via the one or more hardware processors, the power consumption of the one or more buildings for the predefined forecast horizon using the trained at least one model and a real-time information of occupancy, temperature, weekdays, holidays, and the location of the one or more buildings; and
   measuring by a smart meter, a total power consumption of the one or more buildings in predefined minutes.

2. The processor-implemented method of claim 1, further comprising:
   forecasting, via the one or more hardware processors, a real-time occupancy of the one or more buildings using a moving average model for the weekdays and weekends.

3. The processor-implemented method of claim 1, wherein the SVR model is selected where linear correlation between energy and temperature is greater than predefined threshold value.

4. The processor-implemented method of claim 1, wherein the ANN model is selected where linear correlation between energy and temperature is less than predefined threshold value.

5. The processor-implemented method of claim 1, wherein the predictor matrix is generated to use an input and the power consumption is used as an output for training the selected at least one model.

6. The processor-implemented method of claim 1, wherein the forecasted power consumption value of the predefine day is added to the input data while forecasting the energy consumption for the next day.

7. The processor-implemented method of claim 1, wherein a lag with highest correlation is used to derive the one or more AR features.

8. The processor-implemented method of claim 1, wherein the historical power consumption is measured based on total consumption at one hour, the occupancy at a predefined day and the temperature of the one or more buildings.

9. A system for forecasting a power consumption of one or more buildings for a predefined forecast horizon comprising:
   an input/output interface to receive a historical power consumption data and corresponding range of temperature values, an occupancy data, and a location of the one or more buildings from one or more historical databases, wherein the one or more historical databases maintains physical sensors data of power consumption along with the sensory information useful in the one or more power consumption including occupancy and weather information, wherein the occupancy and weather information is pre-processed to remove discrepancies prior to entering into the historical databases;
   one or more hardware processors;
   a memory in communication with the one or more hardware processors, wherein the one or more hardware processors are configured to execute programmed instructions stored in the memory, to:
   pre-process the received historical power consumption data to remove one or more redundant data, one or more outliers, one or more unreal values from the received historical power consumption data and impute missing values of the received historical power consumption data;
      synchronization of smart meter data with sensory information received from data sources including occupancy and weather information;
      re-arrange the received historical power consumption data to bring proximity between varied time instants of energy consumption by fixing a window on the historical power consumption data, wherein the received historical power consumption data corresponds to a time-of-the-day, a day-of-the-week, a season, and the location of the one or more buildings;
   calculate an energy-temperature correlation using the pre-processed historical power consumption data and a received historical range of temperature value;
   estimate an energy drift using the pre-processed historical power consumption data, wherein energy drift is a change in an average power consumption of a predefined month in consecutive years;
   select at least one model based on the estimated energy drift and the calculated energy-temperature correlation, wherein the at least one model includes one or more of a seasonal support vector regression (SSVR) model, a support vector regression (SVR) model, or an artificial neural network (ANN) model;
   derive one or more auto-regressive (AR) features from the pre-processed historical power consumption data using a partial auto-correlation function;
   generate a predictor matrix using the one or more derived AR features, and the received historical information of occupancy, temperature, and holidays of the one or more buildings;
   train the at least one selected model using the generated predictor matrix;
   forecast the power consumption of the one or more buildings for the predefined forecast horizon using the trained at least one model and a real-time information of occupancy, temperature, weekdays, holidays, and the location of the one or more buildings; and measure by a smart meter, the total power consumption of the one or more buildings in predefined minutes.

10. A non-transitory computer readable medium storing one or more instructions which when executed by one or more processors on a system, cause the one or more processors to perform method for forecasting a power consumption of one or more buildings for a predefined forecast horizon comprising:
   receiving, via an input/output interface, a historical power consumption data and corresponding range of temperature values, an occupancy data, and a location of the one or more buildings from one or more historical databases, wherein the one or more historical databases maintains physical sensors data of power consumption along with the sensory information useful in the one or more power consumption including occupancy and weather information, wherein the occupancy and weather information is pre-processed to remove discrepancies prior to entering into the historical databases;
   pre-processing, via one or more hardware processors, the received historical power consumption data to:
      remove one or more redundant data, one or more outliers, one or more unreal values from the received historical power consumption data; and
      impute missing values of the received historical power consumption data;
      synchronization of smart meter data with sensory information received from data sources including occupancy and weather information;
      re-arrange the received historical power consumption data to bring proximity between varied time instants of energy consumption by fixing a window on the historical power consumption data, wherein the received historical power consumption data corresponds to a time-of-the-day, a day-of-the-week, season, the location of the one or more buildings;
   calculating, via the one or more hardware processors, an energy-temperature correlation using the pre-processed historical power consumption data and a received historical range of temperature value;
   estimating, via the one or more hardware processors, an energy drift using the pre-processed historical power consumption data, wherein energy drift is a change in an average power consumption of a predefined month in consecutive years;
   selecting, via the one or more hardware processors, at least one model based on the estimated energy drift and the calculated energy-temperature correlation, wherein the at least one model includes one or more of a seasonal support vector regression (SSVR) model, a support vector regression (SVR) model, or an artificial neural network (ANN) model;
   deriving, via the one or more hardware processors, one or more auto-regressive (AR) features from the pre-processed historical power consumption data using a partial auto-correlation function;
   generating, via the one or more hardware processors, a predictor matrix using the one or more derived AR features, and the received historical information of occupancy, temperature, and holidays of the one or more buildings;
   training, via the one or more hardware processors, the at least one selected model using the generated predictor matrix;
   forecasting, via the one or more hardware processors, the power consumption of the one or more buildings for the predefined forecast horizon using the trained at least one model and a real-time information of occupancy, temperature, weekdays, holidays, and the location of the one or more buildings; and measuring by a smart meter, a total power consumption of the one or more buildings in predefined minutes.

\* \* \* \* \*